United States Patent Office.

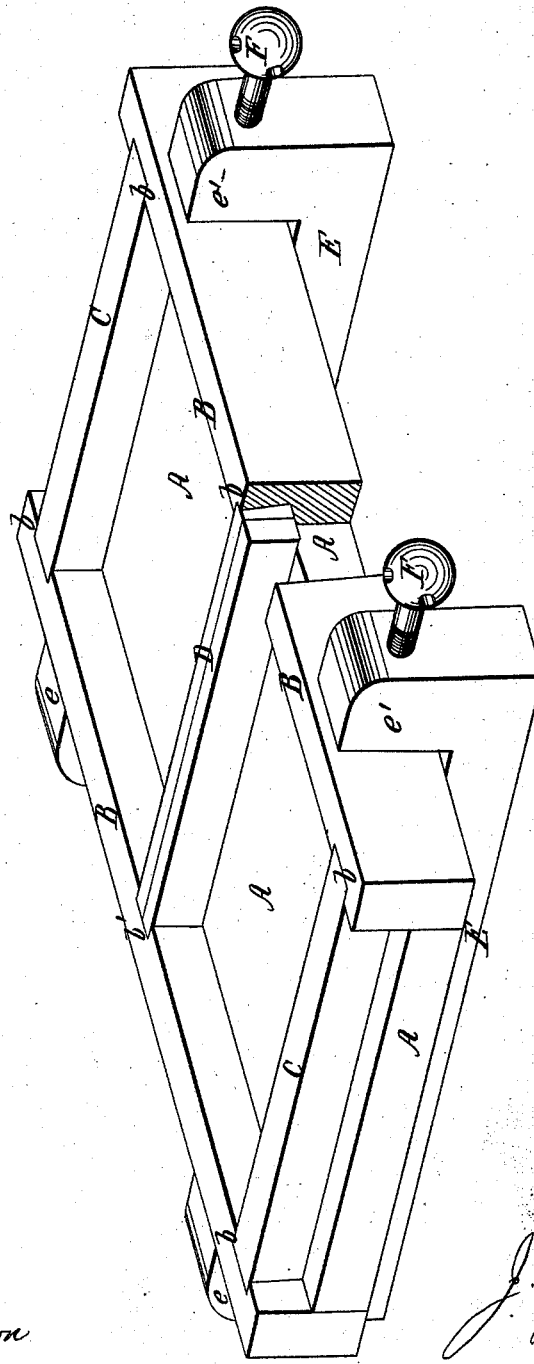

IMPROVEMENT IN MOULDS FOR PLASTIC MATERIAL.

JAY J. WIGGIN, OF CINCINNATI, OHIO.

Letters Patent No. 60,310, dated December 4, 1866.

SPECIFICATION.

TO ALL WHOM IT MAY CONCERN:

Be it known that I, JAY J. WIGGIN, of Cincinnati, in the county of Hamilton, and State of Ohio, have invented a new and useful Mould for Furniture Composition; and I do hereby declare the following to be a full, clear, and exact description of the same, reference being had to the accompanying drawings, forming a part of this specification, and in which my invention is represented by a perspective view, partly in section.

This invention relates to a mould made in rectangular form, and consisting of detachable sections or parts which are firmly held together by jam screws and clamps. It is employed to give shape to the furniture composition or "Egyptian Case Hardened Marble," an invention of my own, which is to be secured by Letters Patent, simultaneously herewith.

In order that others skilled in the art to which my invention appertains may be enabled to fully understand and use the same, I will proceed to describe it in detail.

In the accompanying drawings, A represents the bed or bottom of the mould, B B the side pieces, C C the end pieces, and D the central transverse partition. The latter is shown as made double or in two pieces, but it may be either single or double, as preferred. The side pieces, B B, are formed with mortises or grooves at $b\, b\, b'$ for the reception of the ends of the end pieces, C C, and partition, D. E E are clamps upon which the bottom, A, has its direct support. The jaws, $e\, e'$, of these clamps extend upward at the outer sides of the side piece, B B. F F represent jam screws, working through the jaws, $e'\, e'$, and bearing against the adjacent side piece, B, of the mould, the opposite side piece, B, being thereby clamped firmly against the jaws, $e\, e$. By means of the clamps and screws the parts A B C D are held firmly together; but they may be readily taken apart by releasing the side pieces, B B, from the clamping action of the screws. The partition at D may be removed entirely, so as to leave an undivided moulding area; and longer or shorter side and end pieces may be substituted for B C, the clamps and screws being applicable to moulds of various sizes. When the partition, D, is removed, the grooves, $b'$, may be filled with blocks provided especially for that purpose. The material to be moulded is poured into the mould in its fluid state, and allowed to cool and solidify. The removal of the moulded material may then be facilitated by detaching the several parts of the mould, as above described.

Having thus described my invention, the following is what I claim as new herein, and desire to secure by Letters Patent:

The within described mould, constructed with removable partitions, in the manner and for the purpose shown and described.

J. J. WIGGIN.

Witnesses:
  OCTAVIUS KNIGHT,
  GEO. W. ROTHWELL.